(12) United States Patent
Akdeniz et al.

(10) Patent No.: US 8,468,709 B2
(45) Date of Patent: Jun. 25, 2013

(54) QUICK COMPOSITE REPAIR TEMPLATE TOOL AND METHOD

(75) Inventors: Aydin Akdeniz, Langley, WA (US); Steven D. Blanchard, Issaquah, WA (US); David M. Anderson, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 170 days.

(21) Appl. No.: 12/939,485

(22) Filed: Nov. 4, 2010

(65) Prior Publication Data

US 2012/0111478 A1    May 10, 2012

(51) Int. Cl.
*G01B 3/14*    (2006.01)

(52) U.S. Cl.
USPC .......................................................... 33/563

(58) Field of Classification Search
USPC .................................................. 33/562, 563
See application file for complete search history.

(56) References Cited

U.S. PATENT DOCUMENTS

| | | | |
|---|---|---|---|
| 1,881,651 A * | 10/1932 | Judge | 33/562 |
| 2,795,854 A | 6/1957 | Perkal | |
| 3,046,670 A | 7/1962 | Wydra | |
| 3,389,474 A * | 6/1968 | Linn | 33/562 |
| 3,924,529 A | 12/1975 | Atkinson | |
| 4,874,648 A | 10/1989 | Hill et al. | |
| 5,023,987 A | 6/1991 | Wuepper et al. | |
| 5,214,307 A | 5/1993 | Davis | |
| 5,232,962 A | 8/1993 | Dershem et al. | |
| 5,269,861 A | 12/1993 | Gilbreath | |
| 5,620,768 A | 4/1997 | Hoffmann, Sr. | |
| 5,833,795 A | 11/1998 | Smith et al. | |
| 5,865,397 A | 2/1999 | Herrmann | |
| 5,925,204 A | 7/1999 | Hoffmann, Sr. | |
| 5,958,166 A | 9/1999 | Walters et al. | |
| 6,073,577 A | 6/2000 | Lilleland et al. | |
| 6,124,016 A | 9/2000 | Weil | |
| 6,286,224 B1 * | 9/2001 | Lewis | 33/562 |
| 6,472,758 B1 | 10/2002 | Glenn et al. | |
| 6,904,690 B2 * | 6/2005 | Bakke et al. | 33/562 |
| 7,229,683 B2 | 6/2007 | Fischer et al. | |
| 7,306,851 B2 | 12/2007 | Panse | |
| 7,495,862 B2 | 2/2009 | Flores et al. | |
| 7,575,778 B2 | 8/2009 | Su et al. | |
| 7,686,905 B2 | 3/2010 | Ackerman et al. | |
| 8,109,312 B2 | 2/2012 | Schober | |

(Continued)

FOREIGN PATENT DOCUMENTS

| | | |
|---|---|---|
| DE | 29709179 U1 | 9/1997 |
| GB | 154193 | 7/1921 |

(Continued)

OTHER PUBLICATIONS

International Search Report, dated Nov. 22, 2010, regarding Application No. PCT/US2010/044423 (WO2011028355), 3 pages.

(Continued)

*Primary Examiner* — G. Bradley Bennett
(74) *Attorney, Agent, or Firm* — Yee & Associates, P.C.

(57) ABSTRACT

A composite repair template tool includes a tool body, a convex radius edge on the tool body and a concave radius edge on the tool body.

9 Claims, 9 Drawing Sheets

U.S. PATENT DOCUMENTS

| | | | |
|---|---|---|---|
| 2003/0005995 | A1 | 1/2003 | Miller |
| 2004/0113483 | A1 | 6/2004 | Sylvester et al. |
| 2005/0022923 | A1 | 2/2005 | Korchnak et al. |
| 2005/0051360 | A1 | 3/2005 | Su et al. |
| 2005/0112968 | A1 | 5/2005 | Panse |
| 2005/0272142 | A1 | 12/2005 | Horita |
| 2006/0176611 | A1 | 8/2006 | Flores et al. |
| 2007/0095457 | A1 | 5/2007 | Keller et al. |
| 2009/0139638 | A1 | 6/2009 | Flores et al. |
| 2009/0165928 | A1 | 7/2009 | Schober |
| 2010/0143722 | A1 | 6/2010 | Anderson et al. |
| 2010/0276064 | A1 | 11/2010 | Blanchard et al. |
| 2010/0276065 | A1 | 11/2010 | Blanchard et al. |
| 2012/0137532 | A1* | 6/2012 | Yeh ................................. 33/562 |

FOREIGN PATENT DOCUMENTS

| | | |
|---|---|---|
| GB | 746331 | 3/1956 |
| GB | 2155637 A | 9/1985 |
| WO | 2009080038 A1 | 7/2009 |
| WO | 2011028355 A1 | 3/2011 |
| WO | 2012060944 A1 | 5/2012 |

OTHER PUBLICATIONS

USPTO Office Action, dated Jan. 14, 2011, regarding U.S. Appl. No. 12/328,903, 14 pages.

USPTO Final Office Action, dated Jun. 8, 2011, regarding U.S. Appl. No. 12/328,903, 12 pages.

USPTO Advisory Action, dated Nov. 8, 2011, regarding U.S. Appl. No. 12/328,903, 6 pages.

USPTO Office Action, dated Jan. 13, 2011, regarding U.S. Appl. 12/554,554, 14 pages.

USPTO Office Action dated, Jun. 30, 2011, regarding U.S. Appl. No. 12/554,554, 11 pages.

USPTO Office Action, dated Jan. 13, 2011, regarding U.S. Appl. No. 12/613,810, 17 pages.

USPTO Final Office Action, dated Jun. 22, 2011, regarding U.S. Appl. No. 12/613,810, 16 pages.

PCT Search Report dated Feb. 6, 2012 regarding 09-1067-PCT, application No. PCT/US2011/053402, applicant The Boeing Company, 6 pages.

Greene, "Repair", Marine Composites, Jul. 1999, Accessed Mar. 5, 2012, pp. 285-299 http://www.marinecomposites.com/PDF_Files/U_Repair.pdf.

* cited by examiner

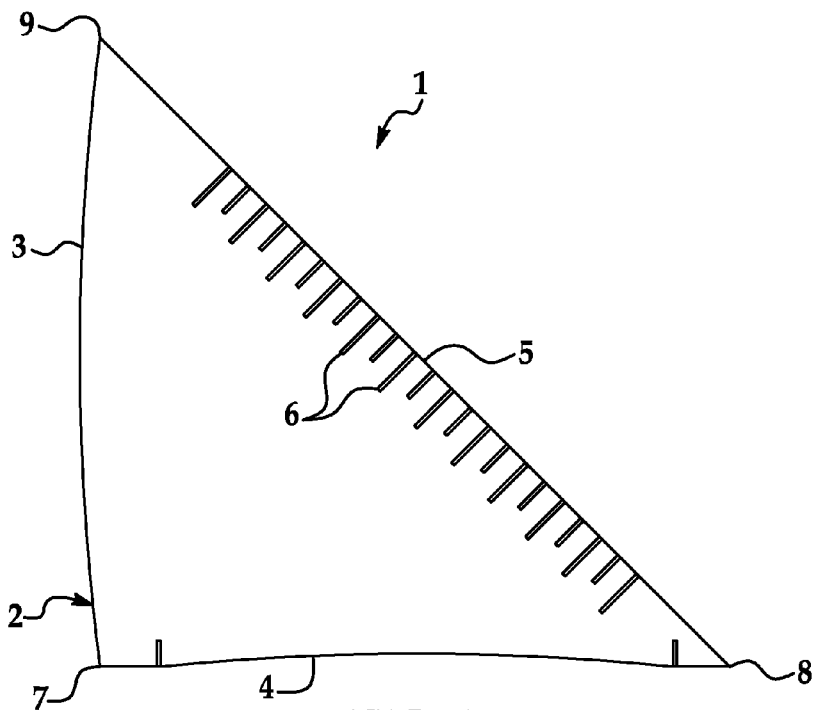
FIG. 1
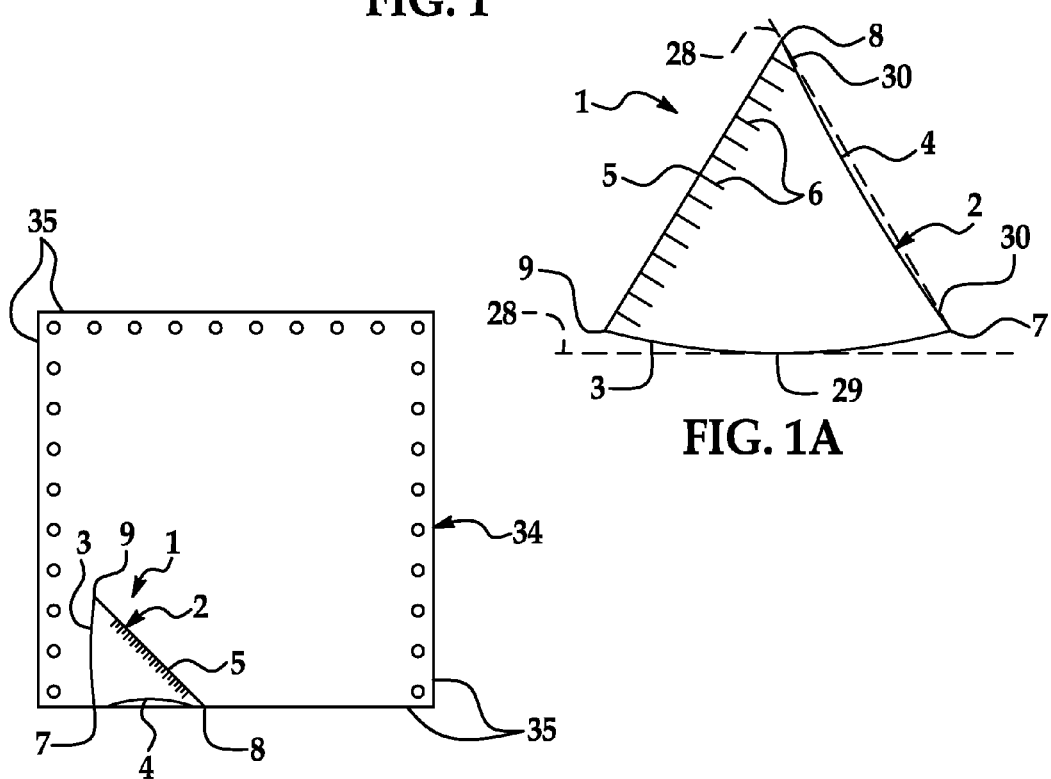
FIG. 1A
FIG. 1B

QUICK COMPOSITE REPAIR TEMPLATE TOOL AND METHOD

TECHNICAL FIELD

The disclosure generally relates to repair of composite structures. More particularly, the disclosure relates to a low-cost quick composite repair template tool and method for expeditiously locating and measuring a repair area on a composite structure for repair of the structure.

BACKGROUND

In the repair of composite structures, measuring tools and hand layout may be used to measure and locate the area which is to be repaired. However, there may be a target time for each repair and conventional repair area measurement and location methods may be time-consuming. Moreover, variations in methods for locating a repair area and applying a repair patch to the area may lead to uncertainty in repair patch position with respect to damage which may affect final load caring capability. Consistency in application and location of repair patches will lead to less uncertainty and better understanding of how loads are introduced into the repair patch. Known position data will provide confidence for the usage and repair application.

A low-cost quick composite repair template tool and method for expeditiously locating and measuring a repair area on a composite structure for repair of the structure is needed to (a) ensure installation time constraints are met, and (b) ensure installation position tolerances are met.

SUMMARY

The disclosure is generally directed to a composite repair template tool for expeditiously locating and measuring a repair area on a composite structure for repair of the structure. An illustrative embodiment of the composite repair template tool includes a tool body, a convex radius edge on the tool body and a concave radius edge on the tool body.

In some embodiments, the composite repair tool may include an alignment template having a damage sizing opening; a plurality of damage sizing sheets carried by the alignment template and having a plurality of different damage sizing openings, respectively. Each opening registering with the damage to the center of the alignment template. The damage sizing openings progressively decreasing in diameter from the largest damage size possible.

The disclosure is further generally directed to a composite repair method. An illustrative embodiment of the method includes providing a composite repair template tool having a tool body with a convex radius edge and a concave radius edge, placing one of the convex radius edge and the concave radius edge of the tool body against a repair surface and initiating a repair process if a contour curvature of the repair surface has an equal to or larger radius than one of the convex radius edge and the convex radius edge of the tool body standard. The convex and concave edges of the radius tool correspond to the minimum allowable radius of curvature on which the quick repair patch may be placed; structure with smaller radius of curvature is not approved for applying the repair patch.

In some embodiments, the composite repair method may include providing a quick composite repair template tool having an alignment template with a damage sizing and locating opening and damage sizing sheets on the alignment plate with progressively smaller damage sizing openings aligned with the damage sizing opening of the alignment template; placing the alignment template against a repair surface; progressively removing the damage sizing sheets from the alignment template until a repair area on the repair surface is able to be fully contained in the center of the sheet opening. The sheets get progressively larger up to the maximum damage size allowed. If damage cannot be fully contained within the sheet with the largest opening or other specified sheet (indicating maximum allowable damage size), the damage is determined to exceed the allowable damage size for which the repaired area may be applied. If damaged area fits within the damage size opening of at least one of the damage sizing sheets with a hole equal to or smaller than the allowable damage area, the damage is first centered within the opening and then the repair may proceed and begin.

BRIEF DESCRIPTION OF THE ILLUSTRATIONS

FIG. 1 is a side view of an illustrative embodiment of the quick composite repair radius check and measurement template tool.

DETAILED DESCRIPTION

Figure 2:
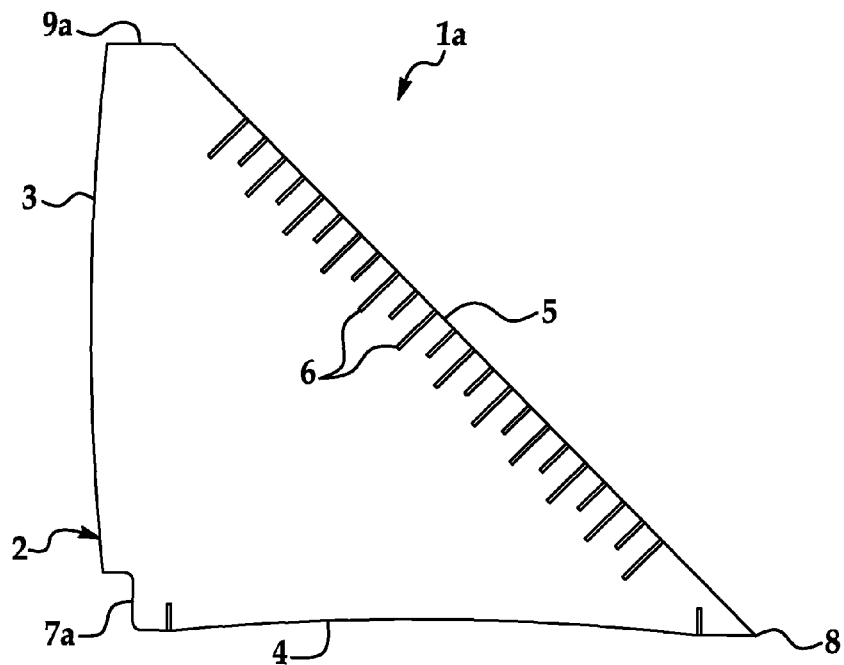
FIG. 2 is an alternative illustrative embodiment of the quick composite repair radius check and measurement template tool.
Figure 3:
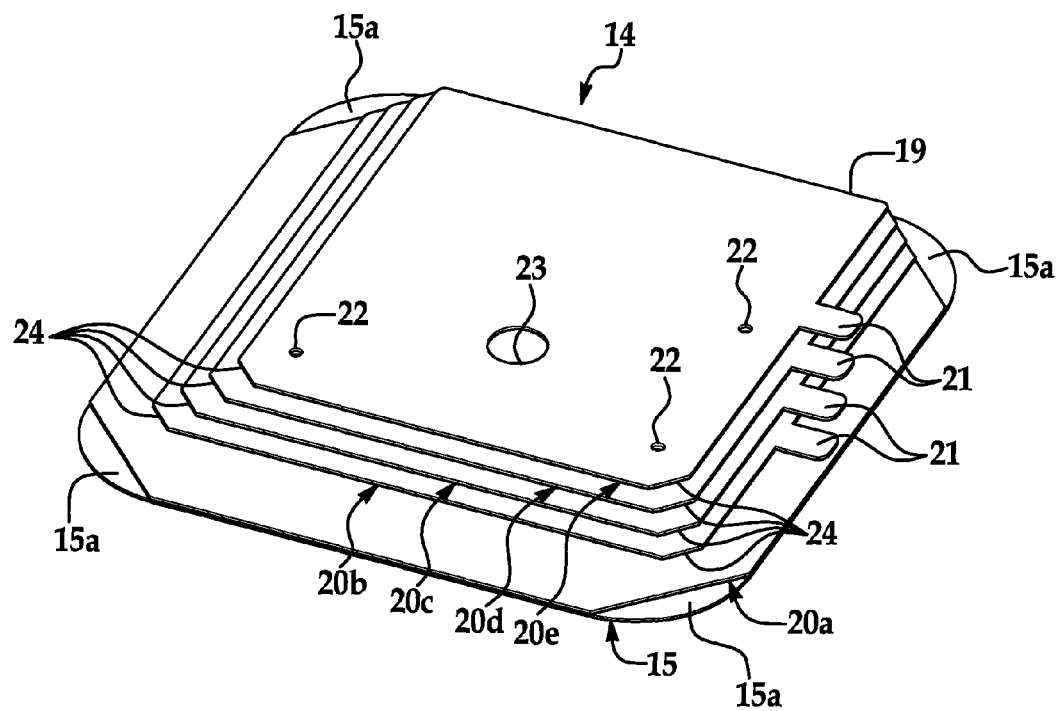
FIG. 3 is a perspective view of an alternative illustrative embodiment of the quick composite repair damage centering template tool.
Figure 4:
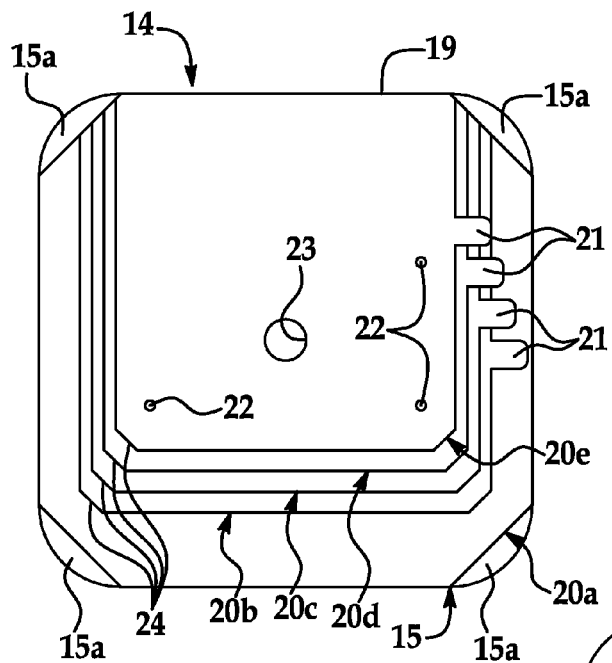
FIG. 4 is a front (top) view of the quick composite repair template tool of FIG. 3.
Figure 5:
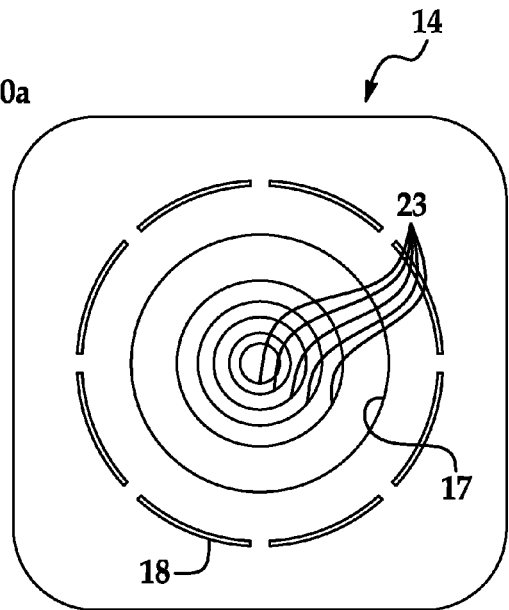
FIG. 5 is a rear (bottom) view of the quick composite repair template tool of FIG. 3.
Figure 6:
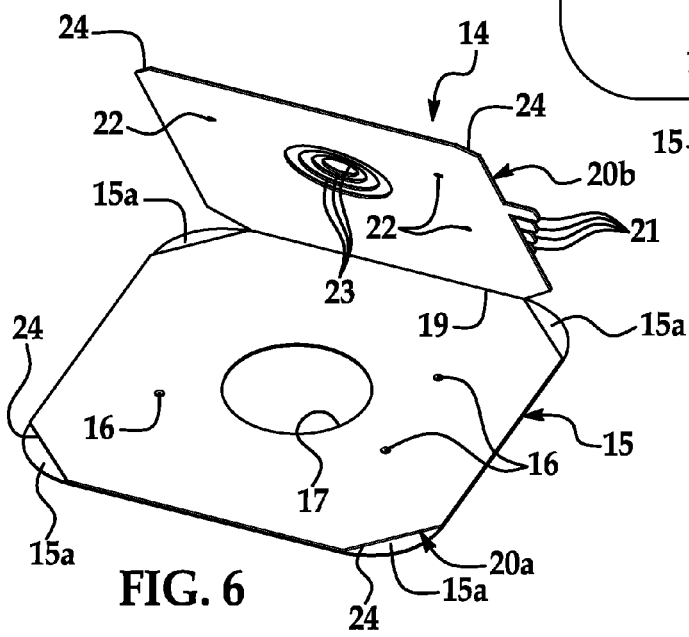
FIG. 6 is a perspective view of the quick composite repair template tool of FIG. 3, with multiple damage sizing sheets lifted from an alignment template of the tool.
Figure 7:
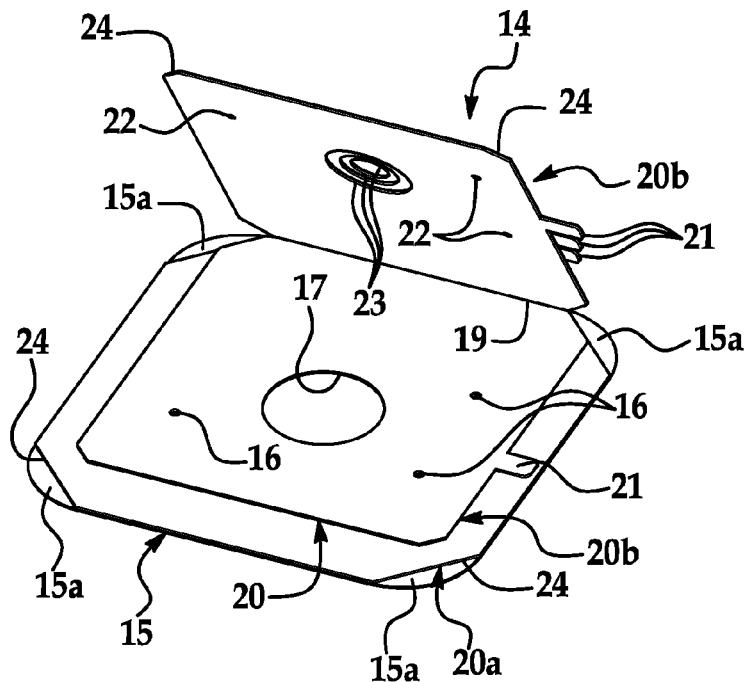
FIG. 7 is a perspective view of the quick composite repair template tool of FIG. 3, with three damage sizing sheets lifted from a bottommost damage sizing sheet which remains on the alignment template of the tool.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Referring initially to FIG. 1, an illustrative embodiment of the quick composite repair template tool, hereinafter tool, is generally indicated by reference numeral 1. The tool 1 may include a tool body 2 which may have a generally triangular shape in some embodiments. The tool body 2 may be a thin and durable water resistant material which may be capable of withstanding sanding and chemicals. In some embodiments, the tool body 2 may be plastic, metal or other suitable material.

The tool body 2 may have a generally convex radius edge 3, a generally concave radius edge 4 and a ruler edge 5. In some embodiments, the tool body 2 may be generally triangular, as shown. Accordingly, the concave radius edge 4 may extend generally perpendicularly from the convex radius edge 3 at a corner 7. The ruler edge 5 may extend from the concave radius edge 4 at a corner 8 and from the convex radius edge 3 at a corner 9. Ruler markings 6 may be provided on the tool body 2 along the ruler edge 5. The ruler markings 6 may be millimeter markings, centimeter markings, inch markings or any combination thereof, for example and without limitation.

In exemplary application, the tool 1 may be used to measure the size and location of an area which is to be repaired on the surface of a composite structure (not shown). Accordingly, the radius of the surface of the repair area may be measured to ensure that the repair area surface has a radius which is able to accommodate a quick composite repair solution. In the event that the surface of the repair area is concave, the convex radius edge 3 may be placed against the repair area surface. In the event that the convex radius edge 3 of the tool body 2 makes full contact with the entire repair area surface, or touches at one point, the radius of the repair area may be of sufficient size to enable use of a quick composite repair patch. On the other hand, in the event that the convex radius edge 3 contacts the repair area with an exact match or the structure surface in two locations and a gap exists between the convex radius edge 3 and the repair area surface, the radius of the repair area surface may be insufficiently small to enable use of a quick composite repair patch to repair the repair area.

In the event that the surface of the repair area is convex, the concave radius edge 4 may be placed against the repair area surface. In the event that the concave radius edge 4 of the tool body 2 makes full contact, with the entire repair area surface, or touches at two points with a gap, the radius of the repair area may be of sufficient size to enable use of a quick composite repair patch. On the other hand, in the event that the concave radius edge 4 contacts the repair area surface at just one point along the concave radius edge 4 and the repair area surface, the radius of the repair area surface may be insufficiently small to enable use of a quick composite repair patch to repair the repair area. (the surface being measured has smaller radius of curvature than the tool surface)

In the event that the convex radius edge 3 matches the concave repair area surface or the concave radius edge 4 matches the convex repair area surface, the ruler markings 6 on the ruler edge 5 of the tool body 2 may be used to measure the location and/or size of the repair area. A quick composite repair patch of suitable size may then be selected and used to repair the repair area according to the knowledge of those skilled in the art.

Referring next to FIG. 2, an alternative illustrative embodiment of the quick composite repair template tool is generally indicated by reference numeral 1a. The tool 1a may have a design which is similar to the tool 1 which was heretofore described with respect to FIG. 1 except the tool 1a may have a notched corner 7a where the convex radius edge 3 meets the concave radius edge 4 and a truncated corner 9a where the convex radius edge 3 meets the ruler edge 5. Accordingly, the tool 1a may have fewer sharp edges or corners than the tool 1 which was heretofore described with respect to FIG. 1.

Figure 11:
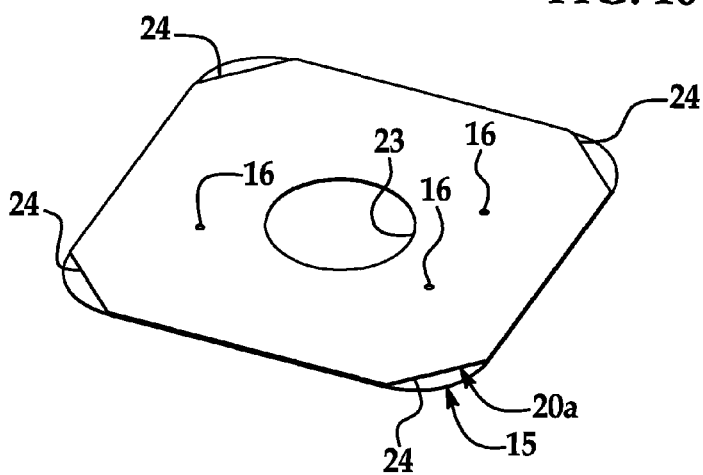
FIG. 11 is a perspective view of the alignment template of the tool of FIG. 3, with all but the largest diameter damage sizing sheet removed from the alignment template.
Figure 12:
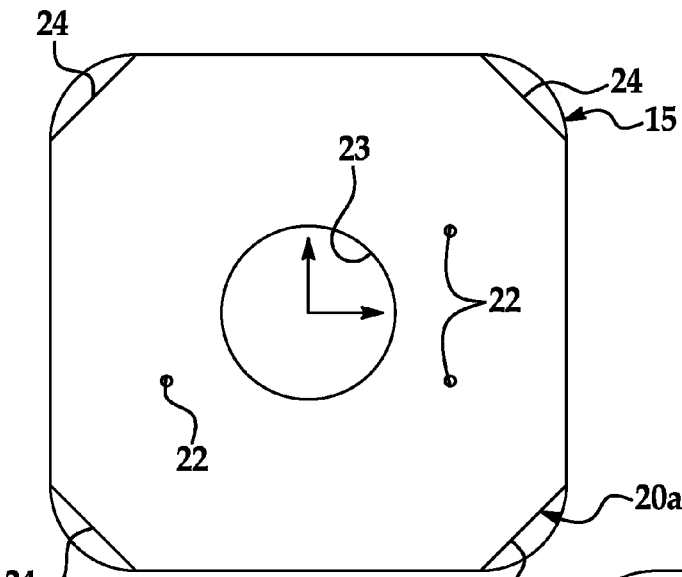
FIG. 12 is a top view of the bottommost damage locating sheet on the alignment template.
Figure 13:
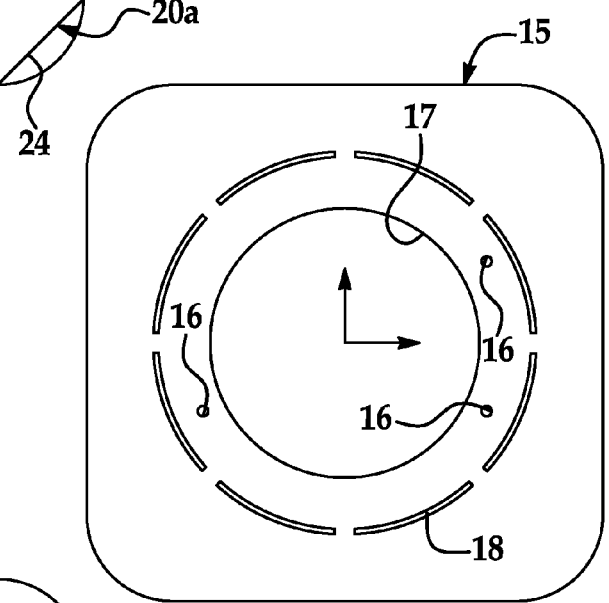
FIG. 13 is a front view of the alignment template of the tool of FIG. 3 which shows all damage sizing sheets removed. and the three colored alignment dots, that will align with damage sizing sheet alignment holes and provide a positive confirmation that all sheets are properly aligned.
Figure 14:
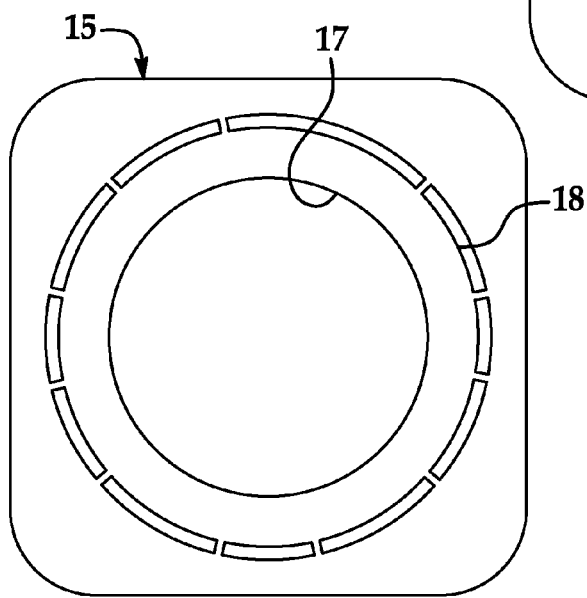
FIG. 14 is a front view of the alignment template of the tool of FIG. 3, more particularly illustrating exemplary dimensions for the various elements of the alignment template.

Referring next to FIGS. 3-13, an alternative illustrative embodiment of the quick composite repair template tool is generally indicated by reference numeral 14. The tool 14 may be a thin and durable water resistant material which may be capable of withstanding sanding and chemicals. In some embodiments, the components of the tool body 14 may be plastic, metal, reinforced paper or other suitable material. The tool body 14 may include an alignment template 15. The alignment template 15 may be sufficiently thin to facilitate bending of the alignment template 15 to the contour of the repair surface to which the alignment template 15 is applied. As shown in FIGS. 11 and 12, multiple alignment markings 16 may be provided on the alignment template 15. In some embodiments, the alignment markings 16 may be colored dots. Other embodiments, the alignment markings may be square, triangular, and oval in shape. A damage sizing opening 17 may extend through the alignment template 15. As shown in FIG. 14, in some embodiments the damage sizing opening 17 may have a diameter of about 6.25 inches. The alignment template 15 may have a length and width of 12.0 inches. Curved slots representing the diameter for a cover patch with perimeter 18 may be provided on the alignment template 15. Slots in the template allow marking the structure in preparation for aligning the perimeter of the cover patch concentrically over the repair patch. In some embodiments, the cover patch perimeter 18 may include slots which extend through the thickness of the alignment template 15. The cover patch perimeter 18 may correspond in diameter to the diameter of a cover patch (not shown) which is to be used to cover and seal a smaller repair patch area on a composite structure, as will be hereinafter described.

Exemplary dimensions for the alignment template 15 according to some embodiments of the tool 14 are shown in FIG. 14. In some embodiments, the alignment template 15 may have a length and width of about 12.0 inches+/−1.0 inch or so). The damage sizing opening 17 of the alignment template 15 may have a diameter about equal to the size of the repair patch+0.25 inches, to represent the repair area plus small margin to have topcoat such as paint removed. The diameter distance difference between the damage sizing opening 17 and the cover patch perimeter 18 may be about 1.25 inches (+/−0.05 inches). In other embodiments, the dimensions of the alignment template 15 may be larger or smaller than those shown in FIG. 14 depending on the desired application of the tool 14.

Multiple damage sizing sheets 20a-20e may be provided on the alignment template 15. The damage sizing sheets 20a-

20e may be sufficiently thin to facilitate bending of the damage sizing sheets 20a-20e to the contour of the repair surface to which the alignment template 15 is applied. The damage sizing sheets 20a-20e may be detachable from the alignment template 15. In some embodiments, the damage sizing sheets 20a-20e may be attached to the alignment template 15 and to each other at a hinge 19 binding and using a removable pressure-sensitive tape to secure the sheets to the sheet below, for example and without limitation. The damage sizing sheets 20a-20e may be selectively detachable from the alignment template 15 and from each other along the hinge 19. Each damage sizing sheet 20a-20e may be generally square or rectangular. A sheet removal tab 21 may extend from each damage sizing sheet 20a-20e. Alignment inspection openings 22 may extend through each damage sizing sheet 20a-20e. The alignment inspection openings 22 may be aligned with the respective alignment markings 16 provided on the alignment template 15. A damage sizing opening 23 may be stacked and extended throw with respect to each opening 23 in each damage sizing sheet 20 and diameter 17 in template 15. The damage sizing openings 23 may be disposed in aligned or registering relationship with respect to each other and the damage sizing opening 17 in the alignment template 15. In some embodiments, the damage sizing sheets 20a-20e may be different colors and the width or diameter of the damage size opening 23 may be marked to enable personnel to easily assess and report the size of the repair area to which the tool 14 is applied. In some embodiments, the damage sizing sheets 20a-20e may progressively decrease in size from the alignment template 15 to the fifth damage sizing sheet 20e.

In some embodiments, the tool 14 may include a first damage sizing sheet 20a provided on the alignment template 15; a second damage sizing sheet 20b provided on the first damage sizing sheet 20a; a third damage sizing sheet 20c provided on the second damage sizing sheet 20b; a fourth damage sizing sheet 20d provided on the third damage sizing sheet 20c; and a fifth damage sizing sheet 20e provided on the fourth damage sizing sheet 20d. In other embodiments, the tool 14 may include a greater or lesser number of damage sizing sheets. The damage sizing sheets 20a-20e may be progressively smaller in size from the first damage sizing sheet 20a to the fifth damage sizing sheet 20e. The damage sizing opening 23 of the first damage sizing sheet 20a may be smaller in size than diameter opening 17 (the repair patch area plus margin) of the alignment template 15, and the damage sizing openings 23 may be progressively smaller in size from the first damage sizing sheet 20a through the fifth damage sizing sheet 20e. In some embodiments, each damage sizing sheet 20a-20e may have truncated corners 24 for purposes which will be hereinafter described.

In one exemplary application, the tool 14 may initially be inspected to determine whether the damage sizing sheets 20a-20e are properly aligned with the alignment template 15. Accordingly, a visual inspection may be made to determine whether the alignment inspection openings 22 in the damage sizing sheets 20a-20e are aligned with the alignment markings 16 (FIG. 13) provided on the alignment template 15. In the event that the damage sizing sheets 20a-20e are properly aligned with the alignment template 15, the alignment inspection openings 22 in the damage sizing sheets 20a-20e register with the respective alignment markings 16 on the alignment template 15. Therefore, the tool 14 can be used to locate, center damage, and measure a repair area on a composite structure. In the event that the damage sizing sheets 20a-20e are not properly aligned with the alignment template 15, the alignment inspection openings 22 in the damage sizing sheets 20a-20e do not register with the respective alignment markings 16 on the alignment template 15 and the tool 14 may be replaced before the repair area location and measurement method is initiated.

The alignment template 15 of the tool 14 may next be placed against the repair area surface (not shown) of a composite structure. The entire repair area should be visible through the patch location plus margin 17 of the alignment template 15 and the damage sizing openings 23 of the respective damage sizing sheet 20a-20e. In some applications, the repair area may include a linear scrape or a near-circular dent. In other applications, the repair area may include an irregular geometric shape. The damage area should be centered within the exposed patch location plus margin 17 such that the repair area is an equal or uniform distance from the perimeter of the patch location plus margin 17.

Figure 8:
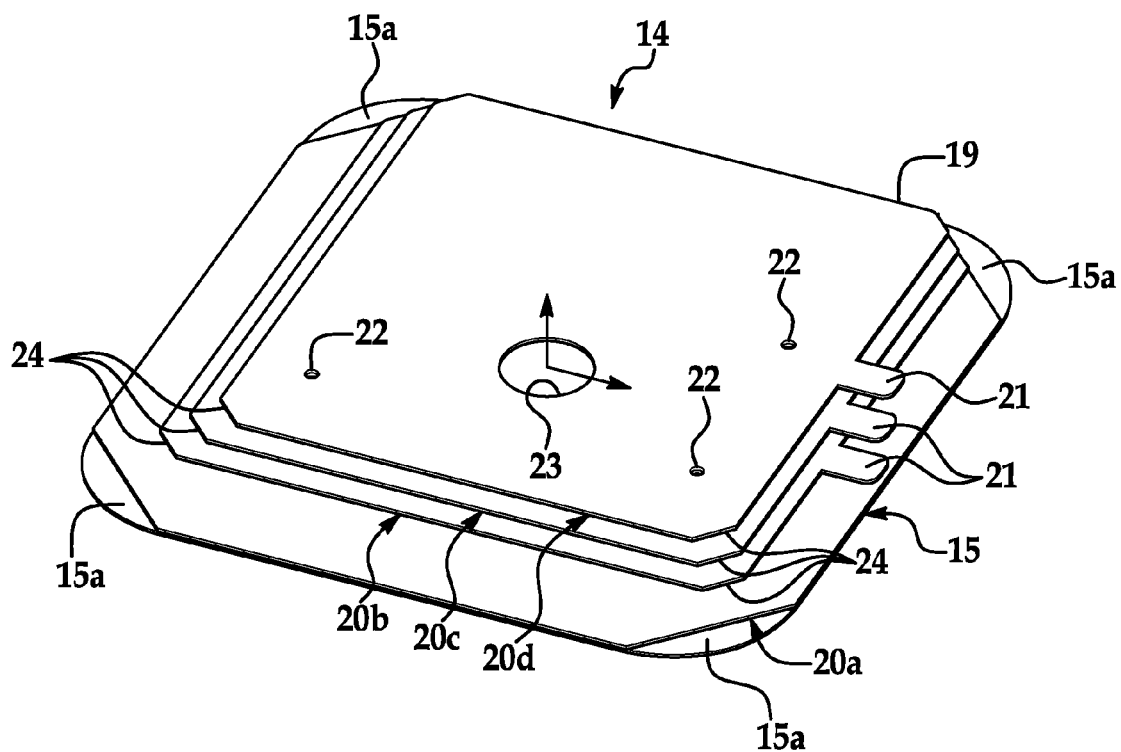
FIG. 8 is a perspective view of the quick composite repair template tool of FIG. 3, with the topmost damage sizing sheet removed from the alignment template.
Figure 9:
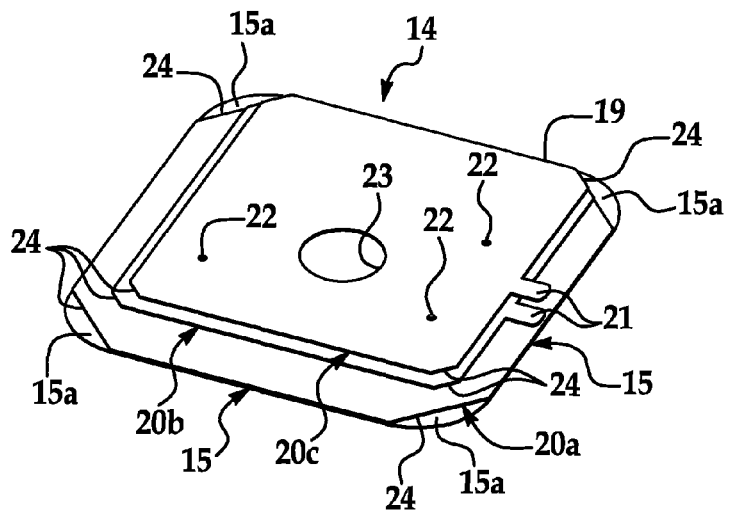
FIG. 9 is a perspective view of the quick composite repair template tool of FIG. 3, with the two topmost damage sizing sheets removed from the alignment template.
Figure 10:
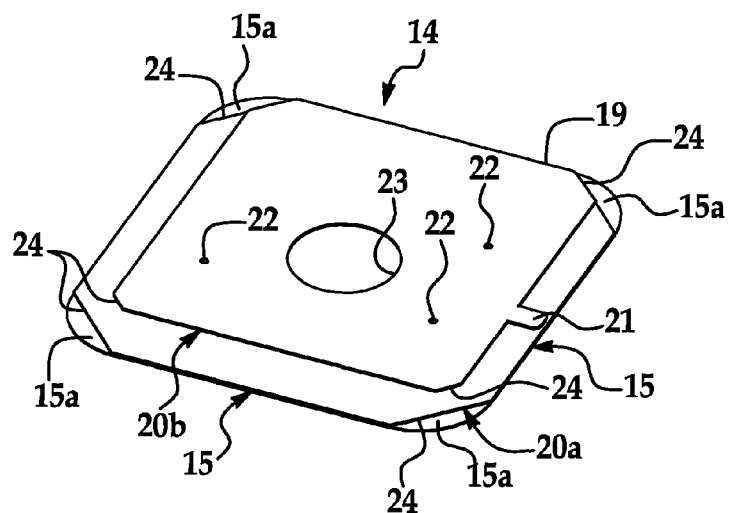
FIG. 10 is a perspective view of the quick composite repair template tool of FIG. 3, with the three topmost damage sizing sheets removed from the alignment template.

In the event that the entire repair area does not fit within in the damage sizing opening 23 of the topmost damage sizing sheet 20 (which corresponds to the fifth damage sizing sheet 20e in FIG. 3), the fifth damage sizing sheet 20e may be removed from the fourth damage sizing sheet 20d such that the first damage sizing sheet 20a through the fourth damage sizing sheet 20d remain on the alignment template 15, as shown in FIG. 8. In the event that the entire repair area does not fit within in the damage sizing opening 23 of the fourth damage sizing sheet 20d, the fourth damage sizing sheet 20d may be removed from the third damage sizing sheet 20c, as shown in FIG. 9. The same process may be carried out with respect to the third damage sizing sheet 200c, the second damage sizing sheet 20b and the first damage sizing sheet 20a until the repair area is centered in the damage size opening 23 of one of the damage sizing sheets 20a-20e. The damage sizing opening 23 of the first damage sizing sheet 20a may correspond to the maximum allowable size of the repair area to enable use of a quick composite repair using a repair patch. The damage sizing sheets 20a-20e may be removed from the alignment template 15 and each other by grasping and pulling the sheet removal tabs 21. This process is documented in FIG. 16.

After the repair area is fitted and centered through the damage sizing opening 23 of one of the damage sizing sheets 20a-20e, the alignment template 15 may be secured to the repair area surface on the composite structure using tape (not shown) or other suitable attachment technique. As shown in the drawings, due to the truncated corners 24 on the damage sizing sheets 20a-20e, the template corners 15a of the alignment template 15 may remain exposed to facilitate taping of the corners of the alignment template 15 to the repair surface. After the alignment template 15 is secured to the repair surface, the remaining damage sizing sheet or sheets 20a-20e may be detached from the alignment template 15. The alignment template 15 may be further secured along its perimeter to the repair surface using additional tape (not shown). In another embodiment of alignment template 14, damage sizing sheets 20 may be recessed and slightly smaller than alignment template 15 on at least one edge, allowing tape securing, and subsequent damage sheet removal.

After the alignment template 15 is secured to the repair surface and the remaining damage sizing sheet or sheets 20a-20e is/are detached from the alignment template 15, the repair area may remain exposed through the damage sizing opening 17 of the alignment template 15 and may correspond to the paint removal and adhesive application area for application of a quick composite repair patch (not shown). The cover patch perimeter 18 on the alignment template 15 may indicate the cover patch cover area. In some embodiments, the cover patch perimeter 18 may include slots which extend through the alignment template 15 and may be used as a pen or marker guide to draw a line on the repair surface. The alignment template 15 may next be temporarily removed from the repair surface. The line which was made using the pen or marker may remain on the repair surface and corresponds to the cover patch perimeter 18 on the alignment template 15, serving as a guide line to apply the cover patch to the repair area. Paint may be removed from the repair surface by sanding the repair surface within the confines of the marked or drawn circle on the repair surface.

The alignment template 15 may then be re-applied to the repair surface and used as a template for application of an adhesive to the repair area. The line which was marked on the repair surface may facilitate realignment of the alignment template 15 with the repair area on the repair surface. An adhesive (not shown) may then be applied to the sanded repair surface within the diameter of the damage sizing opening 17 of the alignment template 15, after which the cover patch may be bonded to the surface using the adhesive and the adhesive may be cured using curing techniques which are well known to those skilled in the art.

Figure 15:
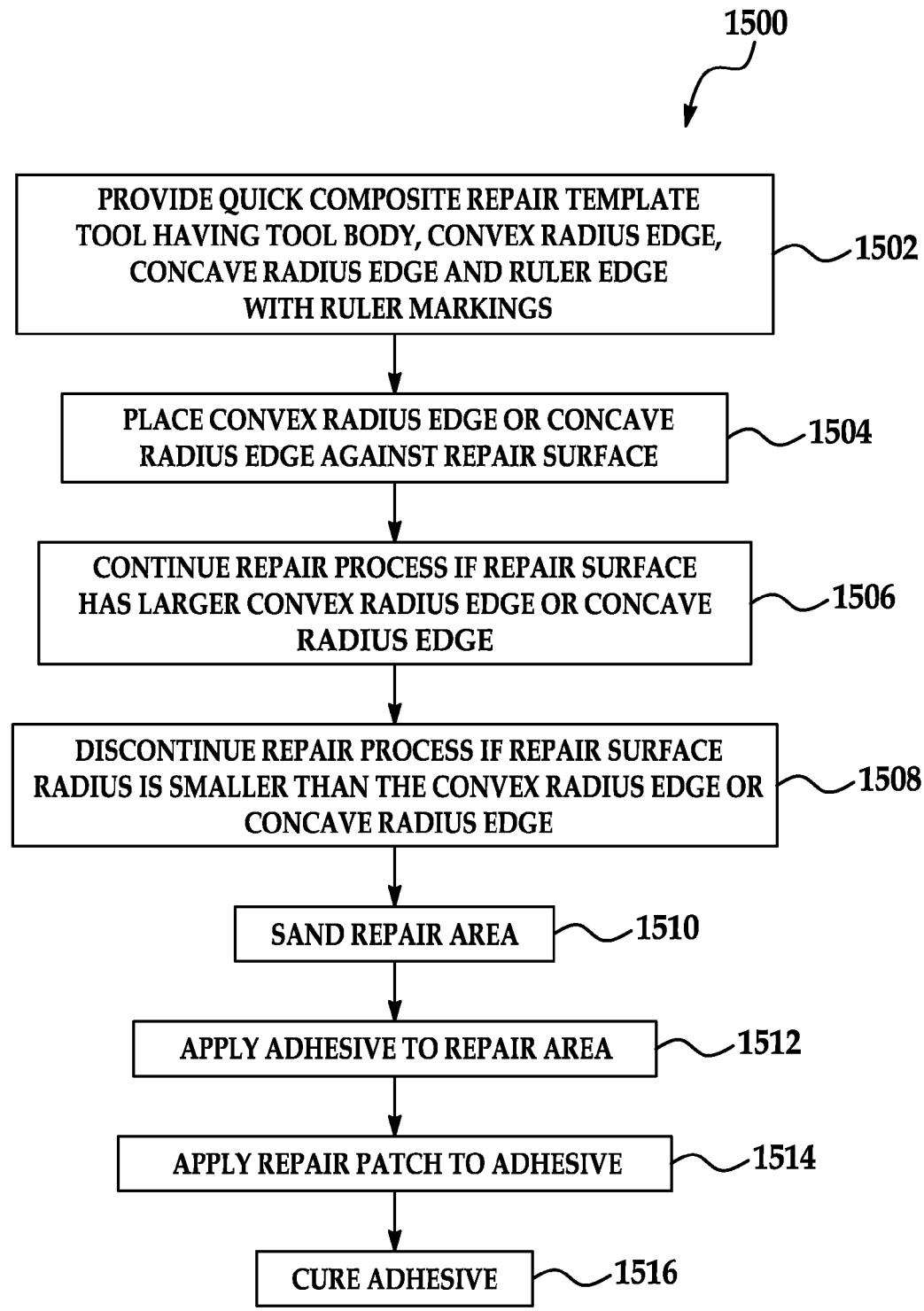
FIG. 15 is an illustrative embodiment of a quick composite repair method.

Referring next to FIG. 15, a flow diagram 1500 of an illustrative embodiment of a quick composite repair method is shown. In block 1502, a quick composite repair template tool having a tool body and a convex radius edge, a concave radius edge and a ruler edge with ruler markings on the tool body may be provided. In block 1504, the convex radius edge or the concave radius edge of the tool body may be placed against a concave repair surface or a convex repair surface, respectively. In block 1506, the repair process may be continued if the concave repair surface matches the contour of the convex radius edge or the convex repair surface matches the contour of the concave radius edge, respectively, of the tool body. In block 1508, the repair process may be discontinued if the repair surface is smaller than the convex radius edge or the concave radius edge of the tool body. In block 1510, the repair area may be sanded. In block 1512, an adhesive may be applied to the repair area. In block 1514, a repair patch may be applied to the adhesive. In block 1516, the adhesive may be cured.

Figure 16:
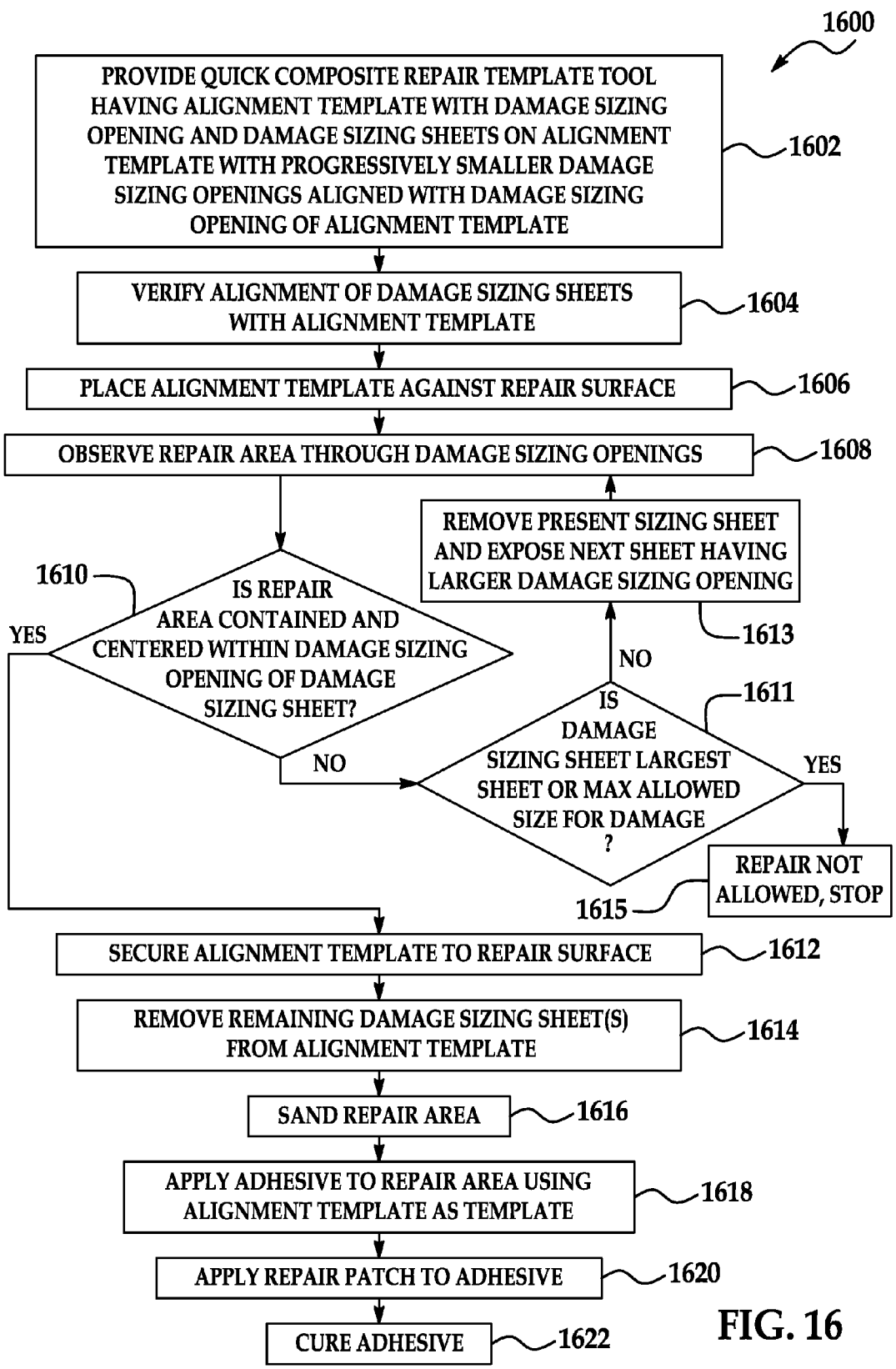
FIG. 16 is an alternative illustrative embodiment of a quick composite repair method.

Referring next to FIG. 16, a flow diagram 1600 an alternative illustrative embodiment of a quick composite repair method is shown. In block 1602, a quick composite repair template tool having an alignment template with a damage size opening and damage sizing sheets on the alignment template may be provided. The damage sizing sheets may have progressively smaller damage sizing openings. In block 1604, alignment of the damage sizing sheets with the alignment template may be verified. In block 1606, the alignment template may be placed against a repair surface. In block 1608, a repair area on the repair surface may be observed through the damage size openings. In block 1610, the damage is centered in the opening of the damage sizing sheets and the question is asked whether the repair area is centered within the damage size opening of the damage sizing sheet. If the answer is yes, then proceed to block 1612. If the answer is no, then proceed to block 1611 to ask the question "is damage sizing sheet the largest sheet or maximum allowed size for damage? If yes then proceed to box 1615 and stop (as damage this large is not allowed). If the answer to 1611 is no, then proceed to block 1613 to remove present damage sizing sheet and expose next sheet having larger damage sizing opening, then proceed to block 1608. In block 1612, the alignment template may be secured to the repair surface. In block 1614, the remaining damage sizing sheets may be removed from the alignment template. In block 1616, the repair area may be sanded. In some embodiments, a fail patch perimeter may be provided on the alignment template, the repair surface may be marked using the cover patch perimeter and the alignment template may be removed from the repair surface prior to sanding the repair area. In block 1618, the alignment template may be replaced on the repair surface and an adhesive may be applied to the repair area using the alignment template as a template. In block 1620, a repair patch may be applied to the adhesive. In block 1622, the adhesive may be cured.

Figure 17:
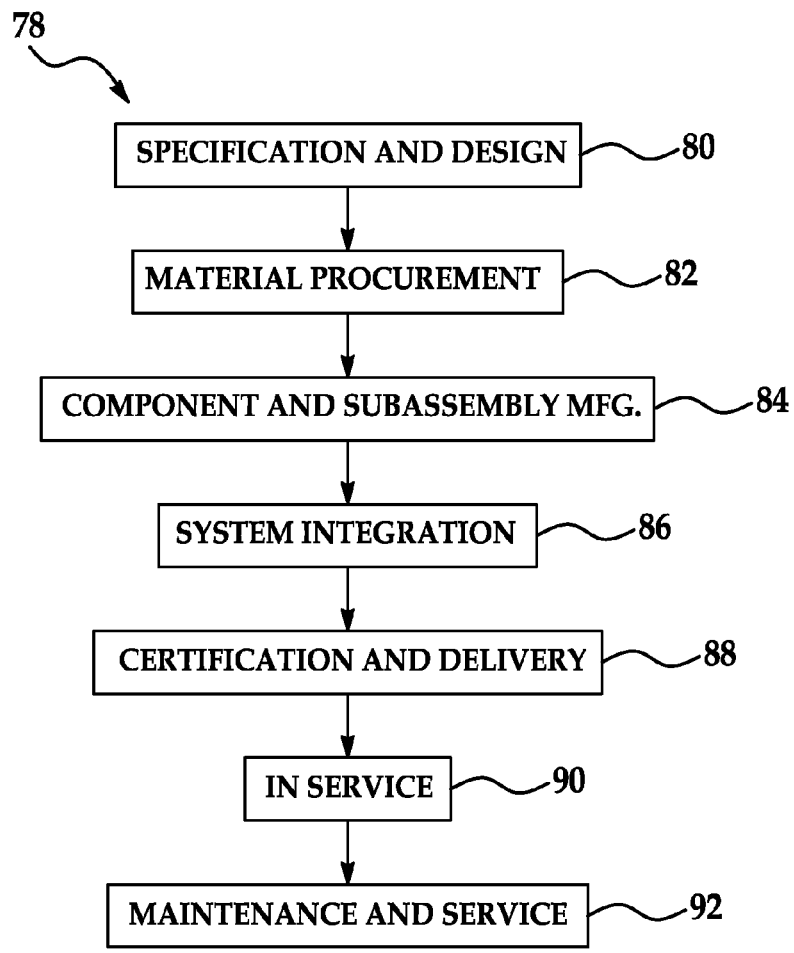
FIG. 17 is a flow diagram of an aircraft production and service methodology.
Figure 18:
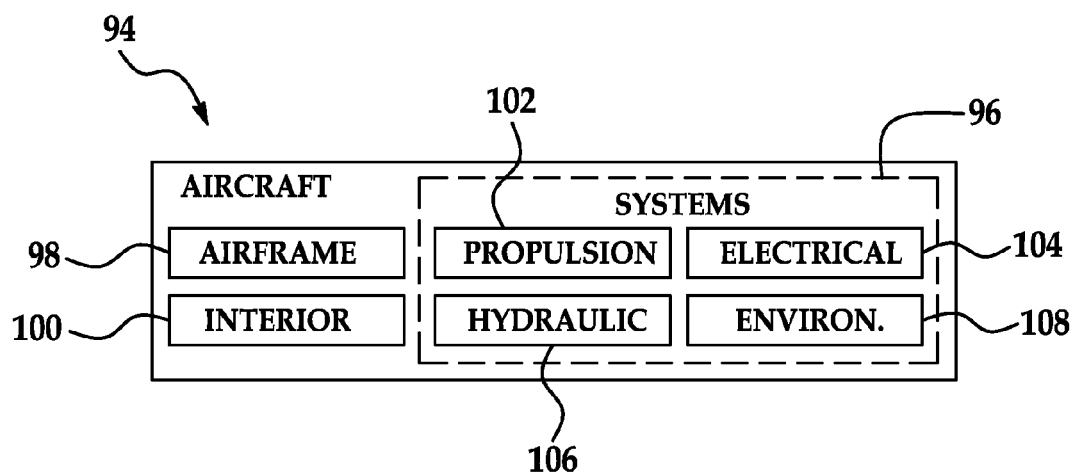
FIG. 18 is a block diagram of an aircraft.

Referring next to FIGS. 17 and 18, embodiments of the disclosure may be used in the context of an aircraft manufacturing and service method 78 as shown in FIG. 17 and an aircraft 94 as shown in FIG. 18. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 18, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:
1. A composite repair tool, comprising:
   an alignment template having a damage sizing opening;
   a plurality of damage sizing sheets carried by the alignment template and having a plurality of concentric damage sizing openings, respectively, registering with the damage sizing opening of the alignment template; and
   the damage sizing openings progressively decreasing in diameter from the alignment template through the plurality of damage sizing sheets, respectively.

2. The composite repair tool of claim 1 further comprising at least one alignment marking on the alignment template and at least one alignment inspection opening on each of the plurality of damage sizing sheets and registering with the alignment marking.

3. The composite repair tool of claim 2 wherein the at least one alignment marking comprises at least one colored dot.

4. The composite repair tool of claim 1 further comprising a plurality of sheet removal tabs on the plurality of damage sizing sheets, respectively.

5. The composite repair tool of claim 1 wherein the damage sizing sheets progressively decrease in size from the alignment template.

6. The composite repair tool of claim 1 wherein at least one of the damage sizing sheets has truncated corners.

7. The composite repair tool of claim 1 wherein the damage sizing sheets are recessed and smaller than the alignment template on more than one edge, allowing the alignment template to be secured to the composite repair tool while allowing the damage sizing sheets to be subsequently removed.

8. The composite repair tool of claim 1 wherein the plurality of damage sizing sheets are temporarily moved to a side, but left attached to a repair surface during at least one event selected from the group of events consisting of sanding, adhesive application and curing.

9. The composite repair tool of claim 1 wherein the plurality of damage sizing sheets comprises a bottom damage sizing sheet, and wherein the damage sizing opening in the bottom damage sizing sheet defines a maximum allowable damage size.

\* \* \* \* \*